United States Patent
Gassoway

(10) Patent No.: US 8,452,015 B2
(45) Date of Patent: May 28, 2013

(54) PROPAGATING KEYS FROM SERVERS TO CLIENTS

(75) Inventor: Paul A. Gassoway, Norwood, MA (US)

(73) Assignee: Computer Associates Think, Inc., Islandia, NY (US)

( * ) Notice: Subject to any disclaimer, the term of this patent is extended or adjusted under 35 U.S.C. 154(b) by 1253 days.

(21) Appl. No.: 11/746,902

(22) Filed: May 10, 2007

(65) Prior Publication Data

US 2008/0279387 A1     Nov. 13, 2008

(51) Int. Cl.
     *H04L 29/06*      (2006.01)

(52) U.S. Cl.
     USPC ........... 380/278; 380/270; 380/273; 380/277; 713/171

(58) Field of Classification Search
     USPC ................... 380/270, 273, 277, 278; 713/171
     See application file for complete search history.

(56) References Cited

U.S. PATENT DOCUMENTS

| | | | |
|---|---|---|---|
| 6,981,139 B2 | 12/2005 | Enokida | |
| 7,133,526 B2 | 11/2006 | Whelan et al. | |
| 7,596,223 B1 * | 9/2009 | Vogel, III | 380/270 |
| 2003/0212889 A1 * | 11/2003 | Khieu et al. | 713/164 |
| 2005/0120203 A1 * | 6/2005 | Yeh et al. | 713/156 |
| 2006/0253577 A1 * | 11/2006 | Castaldelli et al. | 709/225 |
| 2007/0076886 A1 * | 4/2007 | Hori et al. | 380/277 |
| 2007/0180086 A1 * | 8/2007 | Fang et al. | 709/223 |

* cited by examiner

*Primary Examiner* — Brandon Hoffman
*Assistant Examiner* — Hee Song
(74) *Attorney, Agent, or Firm* — Michael J. Buchenhorner

(57) ABSTRACT

A method for key distribution includes steps or acts of: deprecating a first key on a server; receiving a request from a client wherein the client request includes the deprecated key; verifying the client request by using the deprecated key provided in the client request to decrypt the client request; and sending a communication to the client advising that the first key has been updated. An additional step of sending instructions to the client on obtaining the updated key may also be provided. Additionally, instructions on obtaining the updated key may be sent to the client.

16 Claims, 4 Drawing Sheets

PROPAGATING KEYS FROM SERVERS TO CLIENTS

FIELD OF THE INVENTION

The invention disclosed broadly relates to the field of software keys and more particularly relates to the field of propagating updated keys.

BACKGROUND OF THE INVENTION

Key management is a common problem in client/server applications that use encryption. At times keys may become compromised and must be replaced. Even in cases where no key compromise has been detected, information technology (IT) administrators feel it is wise to periodically change encryption keys in the event the key has been compromised without their knowledge.

However, when a key is distributed among many machines, securely updating all of the machines with the new key is difficult and time-consuming. The key should not be distributed in such a way that the key is too easy to obtain from the network (such as sending it over email), yet it must be distributed in a way that is easy for the users to work with. This presents a problem that IT administrators must address. On the one hand, a secure method of key distribution exists (manually updating the keys), but it requires too much human interaction and is costly and cumbersome. On the other hand, an easier and low-cost method exists (distributing via email), but it is not as secure and the updated keys could easily be compromised.

There is a need for a method of key propagation that overcomes the stated shortcomings of the prior art.

SUMMARY OF THE INVENTION

Briefly, according to an embodiment of the invention, a method for key distribution includes steps or acts of: deprecating a first key on a server; receiving a request from a client wherein the client request includes the first a key; verifying the client request by using the first key provided in the client request; and sending a communication to the client advising that the first key has been updated. The method may also include a step of sending instructions to the client on obtaining the updated key. Additionally, the updated key is transmitted to the client. Verifying the client request may include a step of decrypting the client request using the first key.

According to an embodiment of the present invention, a method for receiving an updated key includes steps or acts of: transmitting a client request to a server, wherein the client request includes a deprecated key; and receiving a communication at the client in response to the client request, the communication advising that the deprecated key has been updated. Additionally, the method may include a step of receiving instructions on how to obtain the updated key replacing the deprecated key. Another method step is receiving the updated key. The client may also send random data to the server, the random data encrypted using the deprecated key. The random data may be encrypted using the deprecated key as part of the Hughes variant of the Diffie-Hellman key exchange algorithm.

The method can also be implemented as machine executable instructions executed by a programmable information processing system or as hard coded logic in a specialized computing apparatus such as an application-specific integrated circuit (ASIC).

BRIEF DESCRIPTION OF THE DRAWINGS

To describe the foregoing and other exemplary purposes, aspects, and advantages, we use the following detailed description of an exemplary embodiment of the invention with reference to the drawings, in which.

Figure 1:
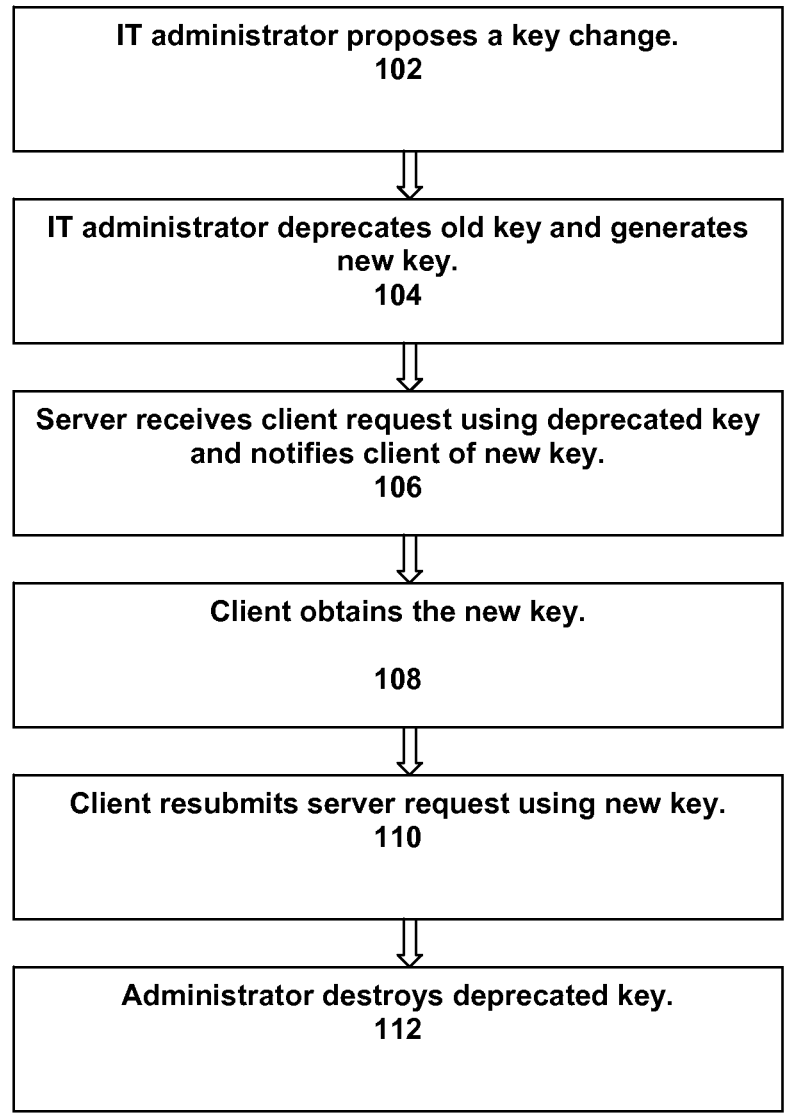
FIG. 1 is a flowchart of a key distribution method according to an embodiment of the present invention.

While the invention as claimed can be modified into alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the scope of the present invention.

DETAILED DESCRIPTION

A solution to the aforementioned shortcomings of key propagation is a secure, low-cost key distribution method initiated from a server or servers to automatically propagate a key from the server or servers to all of the clients that already possess a previously valid key. The propagation occurs with no human interaction. This not only saves time, effort, and cost, but it eliminates the possibility of human error.

Referring now in specific detail to the drawings, and particularly to FIG. 1, there is illustrated a flow chart of a key distribution method 100 according to an embodiment of the invention. The method begins at step 102 wherein an IT (information technology) administrator decides a key should change. The reason for this change may be that the administrator has learned that the current key has been compromised. Or it may be that the administrator feels the key should be changed after a certain amount of time has passed. The administrator may schedule periodic key changes.

In step 104, the administrator deprecates the old key on a server and generates a new replacement key on that server. An advantage of the method according to the invention is that the key need only be manually updated on one server in a client-server environment. Note that deprecating a key is not the same as removing the key. In software, deprecating an object marks that object as not usable. Usually this is done because the object has become obsolete and is being replaced. The administrator keeps the deprecated key for a period of time in order to authenticate requests from clients still using the deprecated key.

In step 106, a client makes a request of the server using the deprecated key. The server does not process the request; instead, the server sends a response to the client indicating that the client's key has been deprecated. This response may include instructions for obtaining the new replacement key. The instructions may be in the form of a link to a location where the new key is located, or a link to a site for downloading the new key.

In step 108 the client then automatically obtains the new key according to the instructions set forth in step 106. In step 110 the client then resubmits its server request using the new key. The client should then destroy the deprecated key and continue using the new key.

Steps 106 through 110 are repeated for every client request using the deprecated key. In this way, all of the server's clients will eventually receive the new key. The update does not require any human interaction, and can occur securely with certain precautions. Since the requester must use a trusted deprecated key in order to receive the new key, the new key is only available to trusted machines. In step 112, once the administrator is certain that all clients have been updated; the deprecated key may be destroyed. In some cases this may not be feasible, but in other cases, the administrator may keep a list of all clients and compare that list against a list of all clients who have received the updated key.

Figure 2:
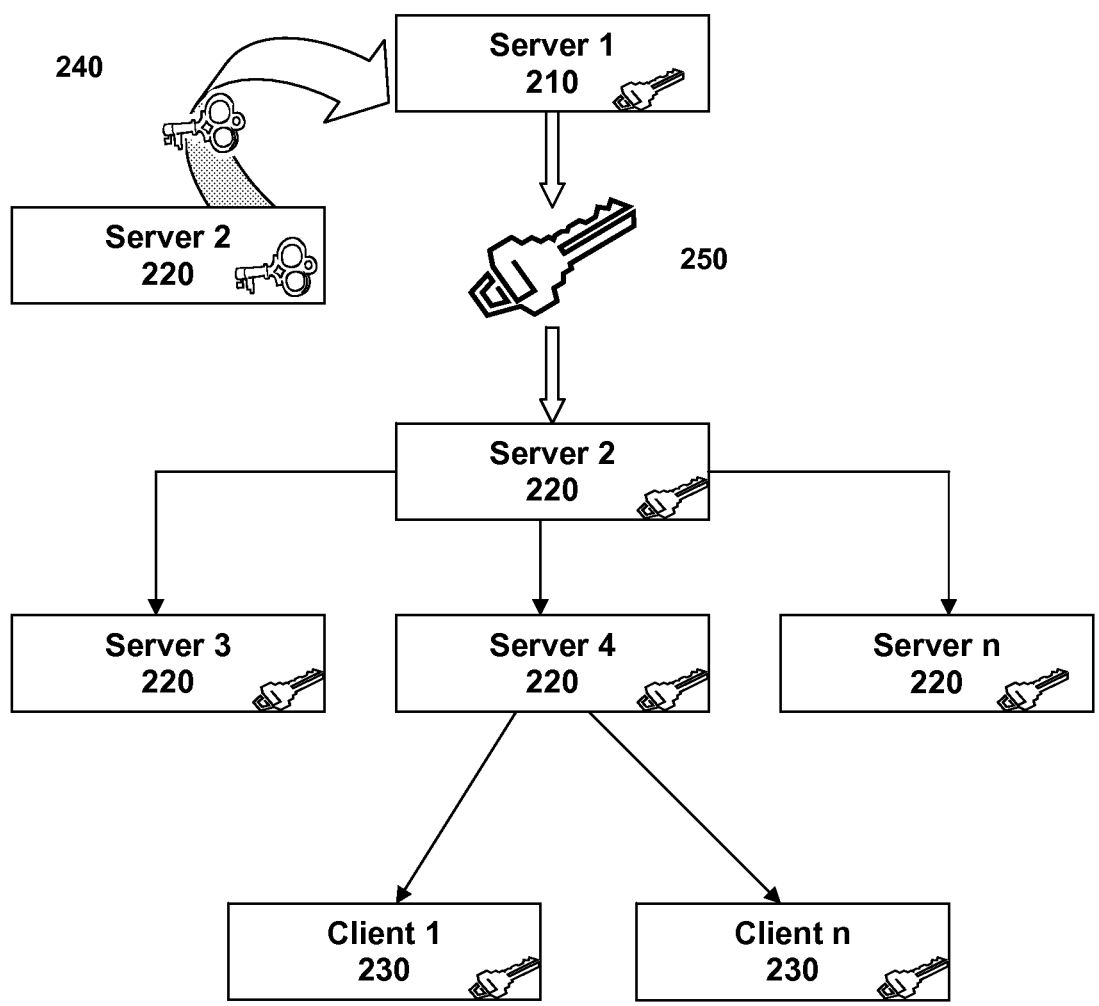
FIG. 2 is a simplified illustration of a key distribution method, according to an embodiment of the present invention.

Referring now to FIG. 2 there is shown an illustrative example of how servers may replicate keys among themselves by periodically acting as clients to other servers. After an administrator deprecates a key 240 on one server 210, the other servers 220 perform some request of the updated server 210. The updated server 210 indicates the key 240 is deprecated using the same method as for any client. The requesting server 220 then deprecates its own key 240 and use the new key 250 provided by the updated server 210. This server 220 which now possesses the updated key 250 acts as an updated server to every other server 220. Those servers in turn are able to pass along the new key 250 to their clients 230 in the same manner in which they received the updated key 250.

For a server farm, it is possible to arrange this in a hierarchy so the administrator must change the key only on one particular server 210. It is also possible that every server 220 could be a client to every other server 220, so a change to any one server 220 would be replicated among all of the servers. This is how an updated key may be propagated among a server farm consisting of upwards of ten thousand servers without any human intervention.

Asymmetric Encryption Keys

A client/server product may employ an asymmetric encryption algorithm, such as RSA, to encrypt its communication. RSA is a public-key encryption algorithm developed by Ron Rivest, Adi Shamir and Leonard Adleman. In a public-key encryption system all clients have a copy of the public key, and only the server has a copy of the private key. All requests encrypted with the public key may only be decrypted by the server, and all replies encrypted with the private key may be decrypted by any client. The point of this kind of encryption is that while it is possible for anyone with the public key to read the replies, it is impossible for anyone without the private key to masquerade as the server and provide bogus replies. Typically, in this arrangement, the public key is not considered to be secret, and may be given to anyone without any concern. The only secret is the private key on the server, and its compromise is a serious problem that would require all machines to change their keys.

Figure 3:
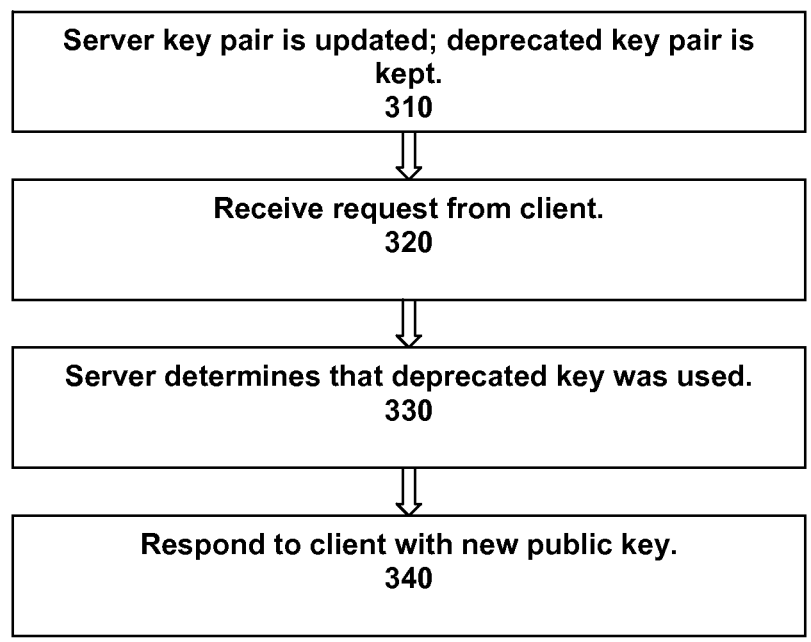
FIG. 3 is a flowchart of a key distribution method using asymmetric encryption, according to an embodiment of the present invention.

Referring to FIG. 3 there is shown a flow chart of a method for propagating keys when asymmetric encryption is used. In step 310, when an administrator suspects that the private key has been compromised, or decides that the key pair is too old, the administrator deprecates the key pair on a server. The server maintains the deprecated key pair to enable it to decrypt requests.

Next, in step 320, the server receives a client request with the now deprecated key. The server does not process the request and instead provides the new public key to the client. In step 330, the server may detect that a deprecated key is in use by a plaintext key ID sent as part of the request. Or the server may notice that the decryption of the client request using the new private key failed, and so try again using the deprecated keys. Once a deprecated key successfully decrypts the request, the server knows a deprecated key was used. There are other methods of detecting the use of a deprecated key that this architecture may use.

In step 340, once the server detects the use of a deprecated key, it provides the new public key in its response to the client. Providing the new public key may take the form of sending a communication to the client with the location where the new public key may be found. This response may be encrypted using the deprecated private key.

If the administrator considers the public key to be non-secret, the key may be provided in plain text, and the response is marked in such a way that the client realizes the response is not encrypted. Another way to provide the client with the new key is for the response to provide only an error code indicating the use of a deprecated key. The client would then send random data encrypted using the deprecated public key as part of the Hughes variant of the Diffie-Hellman key exchange algorithm. The server would then send its computation back to the client encrypted using the deprecated private key, and the client would complete its computation, thus deriving the new public key. The last method has the advantage that the new public key cannot be derived using a packet sniffer, even if the sniffer has gained access to the old public key.

Thus, the new public key is only available to machines that make a request using the deprecated public key. These are assumed to be valid clients. This is one example of method for exchanging keys within the spirit and scope of the invention. Other key exchange methods involving encryption/decryption can be advantageously used with this architecture.

Symmetric Encryption Keys

A client/server product may employ symmetric encryption, such as Advanced Encryption Standard (AES), to encrypt its communication. When using symmetric encryption, all clients and servers have the same key and only a machine with that key can read or write requests or replies from other machines. When using this kind of algorithm, the machines with the key can be thought of as a privileged group of machines that are capable of communicating with each other, but cannot use the product to communicate with a machine outside of that group.

Figure 4:
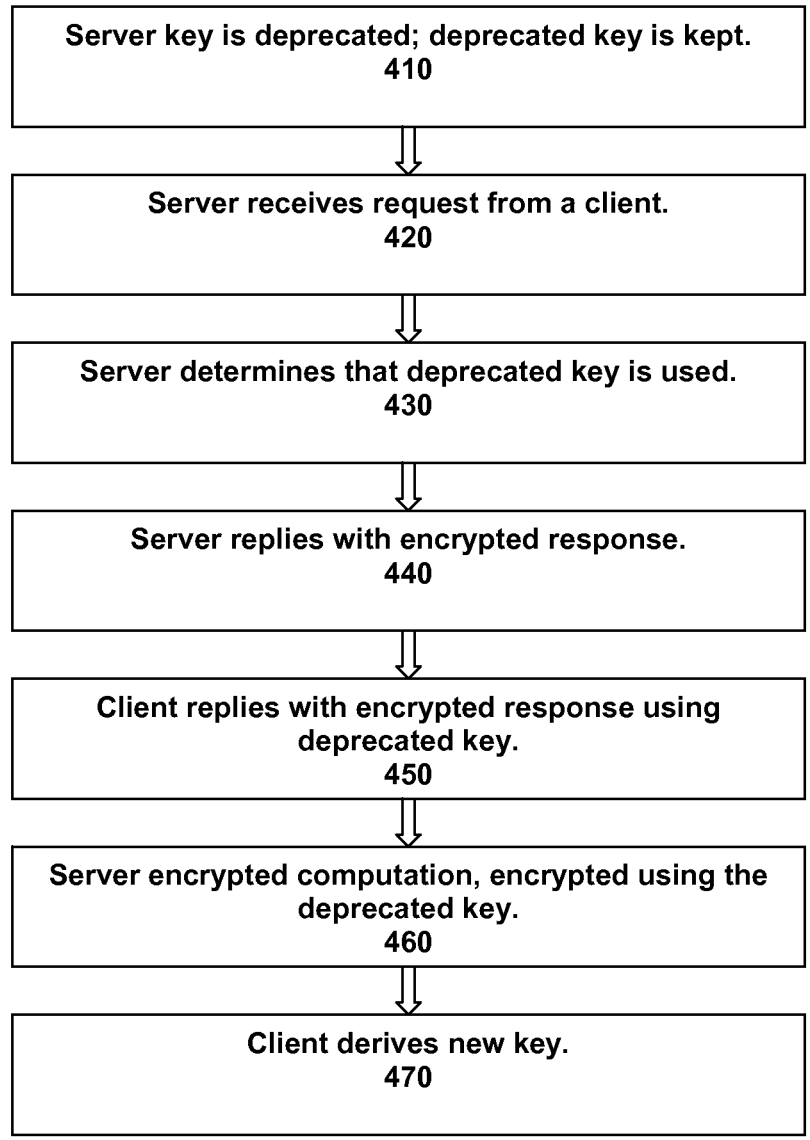
FIG. 4 is a flowchart of a key distribution method using symmetric encryption, according to another embodiment of the present invention.

FIG. 4 shows a flow chart of the method for propagating a key when symmetric encryption is used. In step 410, when an administrator fears that the key has been compromised, or decides that the key is too old, the administrator deprecates the key on a server or servers. The administrator maintains the deprecated key to enable the server to communicate with machines still using the deprecated key. The administrator then generates an updated key replacing the now deprecated key.

Next, in step 420, when a client makes a request using the deprecated key, the server ignores the request and provides the updated key to the client. In step 430, the server may detect that a deprecated key is in use by a plaintext key ID sent as part of the request; or the server may notice that the decryption of the request using the updated key failed, and so try again using the deprecated keys. Once a deprecated key successfully decrypts the request, the server verifies that the deprecated key was used. There are other methods of detecting the use of a deprecated key that this architecture may use.

Once the server detects the use of a deprecated key, in step 440 it forces the client to use the new key by sending a response encrypted with the deprecated key. The response may contain only an error code indicating that the key has been deprecated. Since compromise of the key completely compromises the product in this case, the new key must be exchanged in a way that cannot be compromised by packet sniffing. In step 450, the client sends random data encrypted using the deprecated key as part of a key exchange algorithm, such as the Hughes variant of the Diffie-Hellman key exchange algorithm. The random data needs to be encrypted to prevent someone without a deprecated key from requesting the updated key.

Next, in step 460, the server then sends its computation back to the client. The computation is encrypted using the deprecated key, and in step 470 the client completes the computation, thus deriving the updated key. This has the advantage that the updated key cannot be derived using a packet sniffer, even if the sniffer has access to the deprecated key. Thus, the updated key is only available to machines that make a request using a deprecated key. There are a variety of other secure methods of exchanging keys which this architecture may use.

Therefore, while there have been described what are presently considered to be the preferred embodiments, it will be understood by those skilled in the art that other modifications can be made within the spirit of the invention. The above descriptions of embodiments are not intended to be exhaustive or limiting in scope. The embodiments, as described, were chosen in order to explain the principles of the invention, show its practical application, and enable those with ordinary skill in the art to understand how to make and use the invention. It should be understood that the invention is not limited to the embodiments described above, but rather should be interpreted within the full meaning and scope of the appended claims.

I claim:

1. A method of key distribution comprising:
   in a server in a server-client environment, using a process for performing steps of:
   encrypting communications;
   deprecating a first key associated with the server;
   generating an updated key as a replacement for the first key;
   receiving a request from a client wherein the client request comprises the first key;
   verifying the client request by validating the first key, without processing said client request;
   sending a communication to the client advising that the first key has been updated, wherein said communication comprises instructions to the client advising where to obtain the updated key; and
   processing the client request upon receiving a resubmission of the client request using the updated key.

2. The method of claim 1 further comprising a step of transmitting the updated key to the client.

3. The method of claim 1 further comprising a step of destroying the first key once it has been determined that all clients have received the updated key.

4. The method of claim 1 wherein the step of receiving the client request comprises receiving a request from another server.

5. The method of claim 1 wherein the step of verifying the client request comprises decrypting the client request using the first key.

6. The method of claim 5 wherein the step of sending the communication to the client comprises sending an error code indicating use of the first key.

7. The method of claim 1 wherein the step of sending the communication to the client comprises sending a public key as part of an encryption method.

8. The method of claim 1 further comprising a step of generating the updated key on the server to replace the first key.

9. The method of claim 1 wherein encrypting the communications comprises encrypting said communications with a Rivest Shamir Adleman (RSA) algorithm.

10. A method for receiving an updated key, the method comprising:
    in a client device as part of a server-client environment, performing steps of:
    encrypting communications;
    transmitting a client request to a server, wherein the client request comprises a deprecated key;
    receiving a communication from the server in response to the client request, the communication advising that the deprecated key has been updated;
    wherein said communication comprises instructions advising where to obtain an updated key to replace the deprecated key;
    obtaining the updated key after executing the instructions; and
    transmitting a second client request to the server, wherein said second client request comprises the updated key.

11. The method of claim 10 further comprising a step of:
    sending random data to the server, the random data encrypted using the deprecated key in compliance with the instructions.

12. The method of claim 11 wherein the step of sending the random data comprises sending random data encrypted using the deprecated key as part of a Hughes variant of a Diffie-Hellman key exchange algorithm.

13. A non-transitory computer readable medium comprising program instructions for causing a processor to:
    encrypting communications;
    deprecate a first key associated with a server in a server-client environment;
    generate an updated key as a replacement for the first key;
    receive a request from a client wherein the request comprises the first key;
    verify the client request by validating the first key, without processing said client request;
    send a communication to the client advising that the first key has been updated, wherein said communication comprises instructions to the client advising where to obtain the updated key; and
    processing the client request upon receiving a resubmission of the client request using the updated key.

14. The non-transitory computer readable medium of claim 13 further comprising a step of transmitting the updated key to the client responsive to the client successfully executing the instructions.

15. An information processing system for distributing an updated key, the system comprising:
    an input/output interface configured for receiving a request from a client in a client-server environment, wherein the client request comprises a first key associated with a server;
    a processor configured for performing steps of:
    deprecating the first key associated with the server;
    generating an updated key as a replacement for the first key;
    verifying the client request by validating the first key, without processing said client request;
    notifying the client that the first key has been updated;
    sending the client instructions advising where to obtain the updated key; and processing the client request upon receiving a resubmission of the client request using the updated key.

16. The information processing system of claim 15 further comprising: an encryption mechanism configured for encrypting and decrypting data.

\* \* \* \* \*